Sept. 29, 1970  J. R. TIFFIN ET AL  3,531,555
PROCESS FOR FORMING FOAMED CONTAINERS
Original Filed March 1, 1963  2 Sheets-Sheet 1
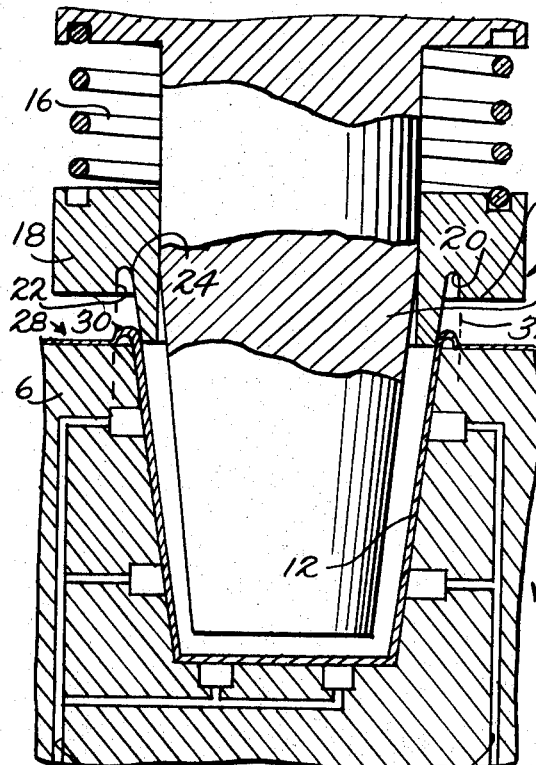
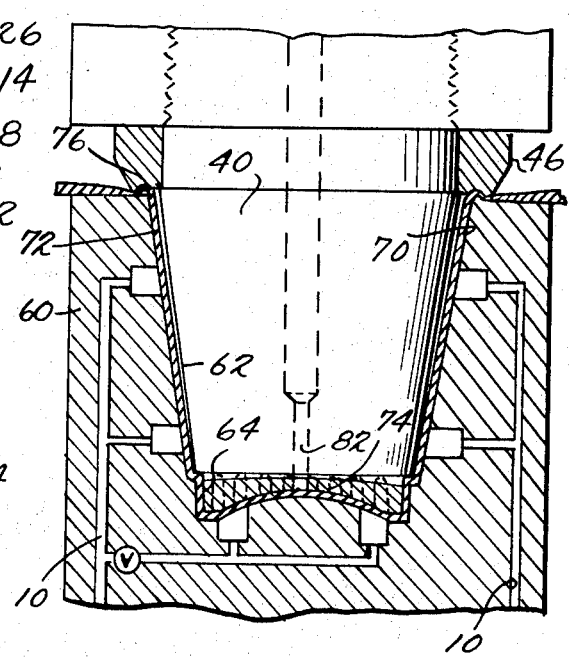
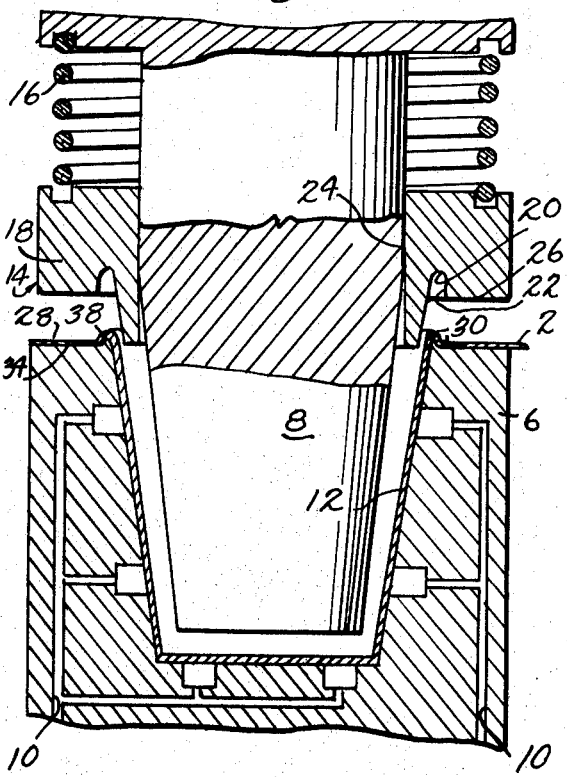
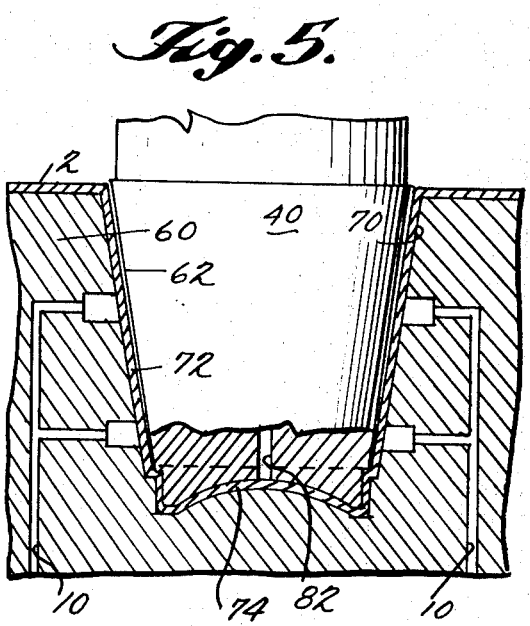
INVENTORS
JAMES R. TIFFIN
BY WALTER O. WEBER
Cushman, Darby & Cushman
ATTORNEYS

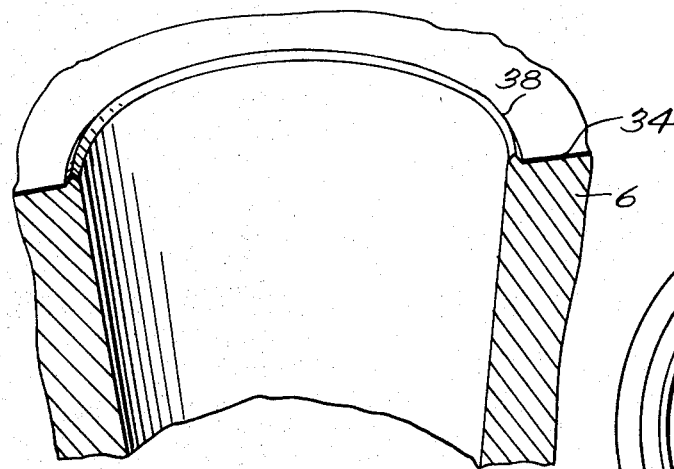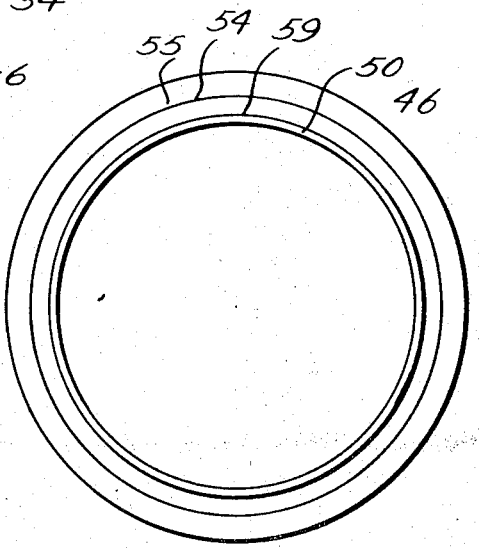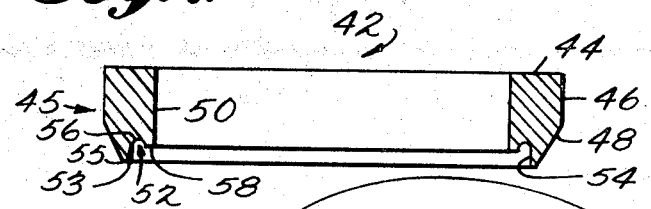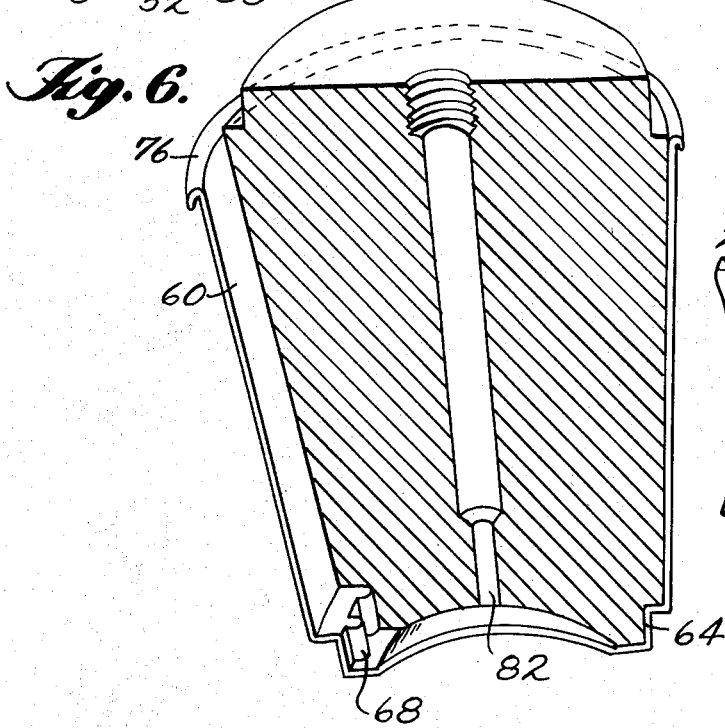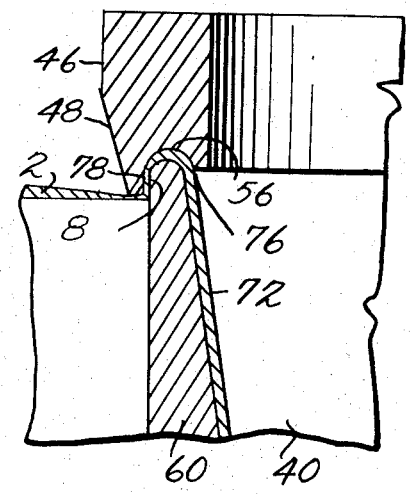

United States Patent Office 3,531,555
Patented Sept. 29, 1970

3,531,555
PROCESS FOR FORMING FOAMED CONTAINERS
James R. Tiffin and Walter O. Weber, Newark, Del., assignors, by mesne assignments, to Haskon, Inc., New Castle County, Del., a corporation of Delaware
Continuation of application Ser. No. 261,993, Mar. 1, 1963. This application Feb. 20, 1967, Ser. No. 632,858
Int. Cl. B29c 17/04
U.S. Cl. 264—92                                    2 Claims

ABSTRACT OF THE DISCLOSURE

Thermoforming of containers from a sheet or blank of foamed thermoplastic polymers, the foamed polymer having a nonporous inner and/or outer skin with a foam core. The bottom, annular lip and stacking shoulder are compression molded on the container.

---

This is a continuation of our copending application Ser. No. 261,993, filed Mar. 1, 1963 and now abandoned.

This invention relates to containers and method for forming containers.

Thermoforming containers such as cups or the like, e.g., by using a vacuum, is well known. See Lafferty Pat. No. 3,042,972 and Caine application Ser. No. 176,148, filed Feb. 27, 1962, as a division of application Ser. No. 711,739, filed Jan. 28, 1958, now Pat. No. 3,045,887. When such thermoforming techniques are employed, complicated subsequent operations are required to form the lip. Additionally, it is difficult to achieve a uniform molding of foamed plastics.

Accordingly, it is an object of the present invention to devise an improved method for forming a lip while thermoforming a container.

Another object is to devise an improved method for forming the bottom of a container in a thermoforming operation.

A further object is to eliminate a subsequent lip forming operation in vacuum forming a foamed container.

Yet another object is to eliminate irregularities in forming the lip and/or bottom area of a container.

A still further object is to obtain better distribution of plastic material giving more uniform foamed cups or other containers.

An additional object is to form a stronger bottom on a container.

A further object is to prepare a very sharply defined bottom on thermoformed containers.

A further object is to prepare a foamed container which will rest squarely on a flat surface and have no tendency to tip.

Yet another object is to obtain uniform cups or other containers which will nest to a stacking height within given close tolerances.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by compression molding the lip and/or the bottom portion of a cup or other container, e.g., dish, bucket or tray of foamed plastic while thermoforming the balance of the container. The thermoforming operation is normally a vacuum forming operation although the thermoforming apparatus can operate by pressure, i.e., the reverse of vacuum forming.

The invention will be best understood in connection with the drawings wherein:

FIG. 1 is a vertical elevation partially in section showing a cup thermoforming apparatus including a compression molding lip forming device;

FIG. 2 is a view similar to FIG. 1 illustrating an alternative lip forming device;

FIG. 3 is a partial view showing the top portion of the mold in FIG. 2;

FIG. 4 is a vertical elevation partially in section showing a cup thermoforming apparatus including a compression molding lip forming device and a compression molding bottom forming device;

FIG. 5 is a vertical elevation partially in section showing the thermoforming of a cup with a compression molding bottom forming device;

FIG. 6 is a perspective view partially broken away in section showing a cup and a male plug including the bottom forming device;

FIG. 7 is a vertical section of the lip forming device of FIG. 4;

FIG. 8 is a bottom elevation of the lip forming device of FIG. 7; and

FIG. 9 is an enlarged vertical section illustrating the use of the preferred lip forming device of FIG. 7.

The present invention is suitable for thermoforming containers from a sheet or blank of foamed thermoplastic (heat softenable) polymers. The foamed polymer can have a non-porous inner and/or outer skin with a foam core, the core being over 50% and preferably over 70% of the total thickness of the core and skin or skins or the foam can be a conventional one having no skins. While the invention is most preferably employed with foamed polymers, e.g., foamed polystyrene, it can also be used in thermoforming regular unfoamed thermoplastic polymers such as conventional polystyrene.

The preferred starting material for forming the containers is a sheet of high density thermoplastic resin foam, more preferably a styrene polymer foam having a density of 18 to 43 lbs./cu. ft., most preferably 20 to 35 lbs./cu. ft. Most preferably the foam has a relatively thin inner and outer nonporous skin. Sheets of foamed polymers having nonporous inner and outer skins can be formed in the manner described in Tiffin and Erdman application Ser. No. 261,683, filed Feb. 28, 1963, now abandoned, entitled "Skin."

As the foamed or unfoamed polymers for making the thermoformed containers, there can be used normal crystal grade polystyrene or high impact polystyrene or a mixture containing 5 to 95% normal crystal grade polystyrene and the balance high impact polystyrene. When employing a thermoplastic styrene polymer it normally contains greater than 50% by weight of styrene and preferably at least 70% by weight of styrene in its structure. High impact polystyrenes are frequently prepared by polymerizing monomeric styrene in the presence of 2½ to 10% by weight of a rubbery diene polymer or by polymerizing styrene in the presence of such amounts of a difunctional material. Examples of high impact styrenes include a terpolymer of 5% acrylonitrile, 5% butadiene and 90% styrene; a copolymer of 5% butadiene and 95% styrene; the product made by polymerizing 95% of styrene in the presence of 5% of polybutadiene; a copolymer of 5% chloro-sulfonated polyethylene and 95% styrene; a blend of 97.5% polystyrene and 2.5% polybutadiene; a blend of 95% polystyrene and 5% of hydrogenated polybutadiene containing 35.4% residual unsaturation; polystyrene formed in the presence of 5% hydrogenated polybutadiene containing 4.5% of residual unsaturation; a blend of a 5% polystyrene and 5% polyisoprene, and a copolymer of 99.5% styrene and 0.5% divinyl benzene.

Unless otherwise indicated all parts and percentages are by weight.

The foamable thermoplastic resins which can be extruded according to the invention include cellulose ethers and esters, e.g., ethyl cellulose, cellulose acetate, cellulose acetate-butyrate, homopolymers and interpolymers of monomeric compounds containing the $CH_2=C$ grouping such as olefins, e.g., ethylene, propylene, isobutylene, vinyl halides, e.g., vinyl chloride; vinylidene chloride; vinyl esters of carboxylic acids; e.g., vinyl acetate; vinyl stearate, vinyl benzoate, vinyl ethers, e.g. vinyl methyl ether; vinyl ethyl ether, vinyl isobutyl ether; unsaturated carboxylic acids and derivatives thereof, e.g. acrylic acid, methacrylic acid, methyl acrylate, ethyl acrylate, methyl methacrylate, acrylamide, acrylonitrile, methacrylonitrile, and interpolymers of the above mentioned vinylidene monomers with alpha, beta-unsaturated polycarboxylic acids and derivatives thereof, e.g. maleic anhydride, diethyl maleate, dibutyl fumarate, diallyl maleate, dipropyl maleate, etc. A preferred class of materials with which optimum results are obtained are rigid, relatively nonelastic thermoplastic resins such as homopolymers of vinylidene aromatic hydrocarbons and ring halogenated derivatives thereof, e.g. styrene, o-chlorostyrene, p-chlorostyrene, 2,5-dichlorostyrene, 2,4-dichlorostyrene, p-methylstyrene, p-ethylstyrene, alpha-methylstyrene, vinyl naphthylene and interpolymers of such vinylidene monomers with each other and with other vinylidene monomers in which the interpolymer contains at least 70% of the vinylidene aromatic hydrocarbon compound, e.g. a copolymer of 70% styrene and 30% acrylonitrile. As previously indicated the most preferred resins are thermoplastic styrene polymers containing at least 70% by weight styrene in the structures.

Other suitable thermoplastic resins include polycarbonates, e.g. the polymer from bisphenol A and diphenyl carbonate; polyurethanes, e.g. from toluene diisocyanate and polypropylene glycol molecular weight 2025; Dacron (polyethylene terephthalate), nylon (e.g. polymeric hexamethylene adipamide).

In the drawings like numbers refer to like parts. Referring more specifically to FIG. 1 of the drawings, there is provided a sheet 2 of foamed polystyrene. The foamed polystyrene was made by forming a mixture of 45 parts of high impact polystyrene (Tuflex 216 which is modified with 5% polybutadiene), 45 parts of regular crystal polystyrene (Dylene 8) and 10 parts Pelescpan 101 (expansible polystyrene beads containing 6% pentane). The foaming was carried out as described in the aforementioned Tiffin and Erdman application to produce a foamed sheet 90 mils thick having a top unfoamed skin of 5 mils, a bottom unfoamed skin of 5 mils and a foamed core of 80 mils. The foamed sheet had a density of 25 lbs./cu. ft.

The foamed polystyrene sheet 2 was heated until pliable, e.g. 175° F. and then passed over a vacuum cup former designated by the numeral 4. The vacuum former 4 comprises a female die 6 and a male die or plunger 8. The female die 6 has conventional vacuum lines 10 therein. A suitable vacuum is 100 mm, The male die at a temperature of, for example, 150° F. in the initial position is above the sheet 2 and is then moved downwardly to loosely force the sheet into the female die 6 where the vacuum then pulls the sheet so that it conforms to the frusto conical inner surface 12 of the female die. Attached to the male die is a lip former 14 having the desired contour on its face. The lip former comprises a spring 16 loaded compression circular molding ring 18. The ring has a lip forming contoured recess 20 therein having outer and inner walls 22 and 24. When the male die is moved downwardly the elongated inner wall 24 engages the portion of the sheet 2 which is within the top portion of die 6, whereas the flat surface 26 of the lip former compresses, e.g. with a pressure of 200 p.s.i., the sheet as shown at 28 so that it is of lesser thickness than the adjacent portions on both sides thereof. As a result the portion of the sheet 2 between walls 22 and 24 is forced into recess 20 to form a beaded lip 30. After formation of the cup including the beaded lip, the male die is raised and the formed cup can be separated from the sheet, e.g. by cutting with a circular knife moving along the dotted lines 32. The cup can then go through a lip roller if desired.

FIGS. 2 and 3 show a modified form of the apparatus of FIG. 1 wherein the upper surface 34 of the female die 6 is provided at its inner end with an upwardly projecting narrow vertical circular flange 38. The presence of the flange 38 further encourages the formation of the beaded lip 30 when the male plug 8 is lowered in the cup forming operation. The flange can be 5/10,000 of an inch high. The compression molding of the beaded lip can be done simultaneously with or before or after the application of vacuum to form the balance of the container.

The method of forming the lip in the manner described above has the advantage over prior art methods of forming the lip that the lip is formed substantially simultaneously with the formation of the rest of the container on the same machine and there is no need to perform the lip forming operation later with a different machine. Additionally, irregularities of the vacuum forming operation are reduced in the area of the lip. Furthermore the circular ring 18 acts as a clamp to achieve a more uniform molding. Since the thickness of the material is reduced at the point of trimming from the sheet, it is easier to perform the trimming operation.

The presently preferred method and apparatus are shown in FIG. 4. Attached directly to the male die 40, in any suitable manner, there is a lip former or vacuum assist ring 42. The vacuum assist ring top wall 44 is horizontal although this is not critical. As best shown in FIG. 7, while the exterior wall 45 commences at a vertical portion 46, it then tapers downwardly and inwardly at 48 at an angle of 30° with the horizontal. The inner wall 50 of the vacuum assist ring 42 is vertical and shorter than the exterior wall. The bottom wall is so designed as to provide a lip receiving recess 52. Commencing at the bottom 55 of the exterior wall 45 the bottom wall comprises a short horizontal portion 53, a vertical portion 54, a concave arcuate portion 56 which meets at 59, and a horizontal portion 58 which terminates at the inner wall 50. In a typical example, the measurements of the vacuum assist ring were:

| | Inches |
|---|---|
| Top wall 44: | |
| Outer diameter | 3.250 |
| Inner diameter | 2.520 |
| Height of inner wall 50 | 0.535 |
| Vertical height of exterior wall 45 | 0.625 |
| Horizontal portion 53: | |
| Outer diameter | 2.920 |
| Inner diameter | 2.900 |

| Horizontal portion 58: | Inches |
|---|---|
| Outer diameter | 2.633 |
| Inner diameter | 2.520 |
| Radius of arc 56 | 0.625 |
| Height of recess between horizontal portion 58 and top of the arc 56 | 0.020 |

As previously set forth, the vacuum assist ring is attached to the male die or vacuum assist plug 40. The vacuum assist plug 40 in the cup forming section thereof closely follows the contours of the female die 60. Thus, the male die 40 below the vacuum assist ring 42 comprises a downwardly and inwardly tapering frusto conical portion 62 and terminates in a bottom portion 64 which is corrugated to mate with the bottom of the container, e.g. cup 66 which is formed. The corrugations 68 near the bottom of the container are designed to provide a simple nesting or stacking device for the container which will insure that the containers, when stacked inside one another, will nest properly without bending. Thus, the spacing of the corrugations on each mold will normally be different from that of all the other molds. The present invention provides the considerable degree of precision required in forming the corrugation area. The female die 60 has an interior wall 70 which is contoured to form the desired cup. The wall 70 is frusto conical and terminates at the bottom as indicated with corrugations so that it can be used to form a nestable container. The female die 60 is provided with vacuum lines 10. In operation, as the sheet 2 of heated, pliable foamed polystyrene passes over female mold 60 the vacuum assist plug 40 comes down and forces the sheet within the female mold 60. Vacuum, e.g. 14 mm., is applied through line 10 and the side wall 72 of the container 66 is formed. Normally, vacuum is applied to the cup side wall 72 before it is applied to the cup bottom wall 74 although the vacuum can be applied to both simultaneously.

There is a clearance between the vacuum assist plug 40 and the surface 70 of the female mold 60 which is nearly equal to the desired thickness of the product thereby limiting the maximum thickness of the wall 72 if there should be high spots thereon during the thermoforming process. This provides for a given maximum wall thickness at any point on wall 72 permitting each cup to fully slide within another assuring that the bottom surface of one cup will engage the stacking shoulder or the top of the corrugation area of the cup into which it extends. Substantially simultaneously with the vacuum forming of the frusto conical side wall 72 of the cup there is compression molded the cup lip 76 and the cup bottom wall 74. The compressive molding pressure can be varied widely. A compression molding pressure of 200 p.s.i., for example, is adequate both to form the container lip and the corrugated container bottom.

As is best shown in FIG. 9 in compression molding the lip thickness of the foamed polystyrene sheet is reduced in the area 78 between wall 54 of the vacuum assist ring and the mating wall section 80 of the female die. This aids in the shearing operation in that the thickness of the material to be trimmed is reduced. The vacuum assist ring is also of value in that it maintains a maximum wall thickness in either expansible or nonexpansible polymers, e.g., foamed polystyrene or unfoamed polystyrene which permits the use of a universal shear die and other tooling such as a lip roller in post molding operation.

In critical areas such as the trim point and the nestable bottom portion where wall thickness must be maintained accurately, there is a mold surface with a given clearance on both sides of the product.

As shown in FIGS. 4, 5 and 6 the vacuum assist plug 40 is preferably designed to include a pressure line 82 to transmit compressed air, e.g., at 2 atmospheres. The air pressure is not critical but can be varied, e.g., between 1.5 and 3 atmospheres or higher. The air pressure forces the foamed polystyrene into the detail of the nesting device. This can be done either before, during or after the vacuum transfers the sheet 2 from the plug 40 to the female mold 60. Preferably the vacuum is applied to the cup side wall 72 before vacuum is applied to the cup bottom wall and hence the air pressure from the plug initiates the transfer of the cup bottom forming section of the sheet 2 from the male plug 40 to the female mold 60. Then the vacuum is also applied to the bottom of the cup to assist in completing the formation of the cup. The final forming of the top and bottom walls is by the compression molding as described above.

It will be understood that the vacuum lines can be eliminated entirely and the pressure differential in the thermoforming operation can be maintained by the use of positive pressure, e.g., gas pressure such as air pressure, issuing at numerous points on the plug 40. Alternatively, the entire pressure differential forcing the plastic material against the walls of the female mold can be created by the use of vacuum.

The present invention as illustrated in FIG. 4 provides essentially matched die molding of the critical bottom and top areas of the cup in a thermoforming system. The major wall area of the cup, or other container, is still formed as stated by the action of pressure forcing the plastic material against the walls of the female mold.

The use of the top and bottom pieces attached to the male plug normally employed in a thermoforming apparatus and matched to the top and bottom of the female mold provides the following advantages:

(1) Much better distribution of the plastic material giving more uniform cups and other containers.

(2) A stronger bottom since more material can be reproducibly supplied there.

(3) A very sharply defined bottom which makes it possible to have a cup or other container which will nest satisfactorily.

(4) A container which will rest squarely on a flat surface and have no tendency to tip.

(5) Avoidance of the major cause of leaky cups because the uniformity of plastic material flow avoids bubble distortion in a foamed plastic cup and uniformity of thickness at the bottom also provides insurances.

FIG. 5 illustrates a form of the invention similar to that in FIG. 4 except that there is no compression molding of the lip but only compression molding of the bottom portion of the container.

What is claimed is:

1. A method of thermoforming a container from a heated sheet comprising foamed plastic resin, the method comprising: utilizing a plunger and a female mold, said female mold having shoulder means on the side wall thereof; providing said sheet; inserting at least a portion of said plunger in said female mold stretching said sheet within said mold to form a container sidewall, applying a fluid pressure differential between the sidewall of the female mold and the sidewall of the plunger while said plunger sidewall is within the female mold such that there is a greater pressure on the sidewall of the plunger than on the sidewall of the female mold to cause said sheet to adhere to the wall of the female mold in the container sidewall forming portion; the sidewall of said plunger having a clearance from the sidewall of said female mold which is nearly equal to the desired thickness of said container sidewall thereby limiting the maximum thickness of any area on said sidewall; and compression molding an annular lip on said container from said sheet between the top of the female mold and an overlying cooperating portion of said plunger; compression molding the bottom wall between the bottom of the plunger and bottom of the female mold wall; and compression molding a portion of the sidewall of the container between the shoulder means on said female mold and a cooperating portion on said plunger.

2. The method as recited in claim 1 wherein said shoulder means is adjacent said bottom wall.

References Cited

UNITED STATES PATENTS

| | | | |
|---|---|---|---|
| 2,348,871 | 5/1944 | Wiley | 18—19 |
| 3,050,773 | 8/1962 | Hagen | 264—296 X |
| 3,039,911 | 6/1962 | Fox | 264—321 X |
| 3,172,159 | 3/1965 | Edwards | 18—19 |
| 3,173,174 | 3/1965 | Edwards | 18—19 |
| 3,190,530 | 6/1965 | Edwards | 264—296 X |
| 3,214,797 | 11/1965 | Ollier et al. | 264—191 X |

OTHER REFERENCES

Collins, F. H.: Controlled Density Polystyron Foam Extrusion, in SPE Journal, pp. 705–9, July 1960.

DONALD F. NORTON, Primary Examiner

U.S. Cl. X.R.

229—1.5